United States Patent Office
3,190,918
Patented June 22, 1965

3,190,918
PROCESS FOR THE PRODUCTION OF CHLORO-SUBSTITUTED METHYL ISOCYANIDE DICHLORIDES
Hans Holtschmidt, Cologne-Stammheim, Germany, assignor to Farbenfabriken Bayer Aktiengesellschaft, Leverkusen, Germany, a corporation of Germany
No Drawing. Filed Apr. 13, 1962, Ser. No. 187,210
Claims priority, application Germany, May 10, 1961, F 33,897
5 Claims. (Cl. 260—566)

The present invention relates to a new process for the production of chloro-substituted methyl isocyanide dichlorides, which themselves are for the major part novel.

It is an object of the present invention to produce new chloro-substituted methyl isocyanide di-chlorides and to provide a new process for the production of these products. Another object of the invention is to provide a new process for the production of methyl isocyanide dichlorides which starts from simple starting materials, can be carried out in a simple manner and leads to high yields. Yet another object of the invention is to provide a process by which both mono-, di- and tri-chloro-substituted methyl isocyanide dichlorides can be prepared.

It has been found that chloro-substituted methyl isocyanide dichlorides are obtained if carbamic acid halides of the general formula

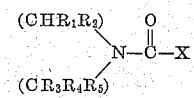

in which $R_1$, $R_2$, $R_3$, $R_4$ and $R_5$ represent chlorine or hydrogen, and X represents bromine or chlorine, are treated at temperatures above 160° C. with chlorine and the chloro-substituted methyl isocyanide dichlorides of the general formula

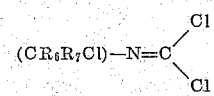

in which $R_6$ and $R_7$ represent hydrogen or chlorine, which are obtained, are isolated.

It is extremely surprising that such reactive compounds, such as the isocyanide dichlorides are formed and are capable of existing at the temperatures necessary for the process of the invention, especially as the chlorine atoms in the alkyl group in α-position to the nitrogen atom are particularly active.

If dimethyl carbamic acid chloride is used as starting material for the process according to the invention and chlorination is carried out under gentle conditions, the course of the reaction can be represented by the following reaction scheme:

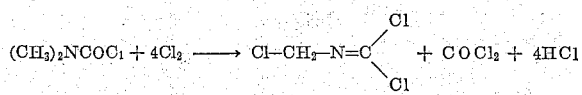

The carbamic acid halides used as starting materials are clearly apparent from the formula. The following may be mentioned as individual examples: dimethyl carbamic acid chloride, bis-chloromethyl carbamic acid chloride, bis-dichloromethyl carbamic acid chloride as well as those carbamic acid chlorides which are chlorinated to different degrees in the two methyl groups, such as mono-chloromethyl-methyl carbamic acid chloride, dichloromethyl-methylcarbamic acid chloride and dichloromethyl-chloromethyl carbamic acid chloride. The acid bromides can also be used in a manner similar to the acid chlorides.

Among the starting materials used according to the invention, dimethyl carbamic acid halides are known. The other products already chlorinated in the alkyl groups are as yet still unknown. However, they can be prepared in simple manner by chlorination of the dimethyl carbamic acid halides. One is concerned here with a chlorination process applied to a methyl group, which is generally known. The chlorination can be carried out with elementary chlorine in ultra-violet light, it being advisable to use temperatures between 20 and 150° C. However, sulphuryl chloride and phosphorus pentachloride may also be used as chlorinating agents. The degree of chlorination of the dimethyl carbamic acid chloride depends primarily on the type of the chlorinating agent being used, but is also depedenent on the chlorination period and temperature. The more severe the chlorination conditions used, the higher is the degree of chlorination. Representative examples describing the production of these new starting products are contained in the examples illustrating the process. The production of the more highly chlorinated products can also be effected by the process according to the invention, these products occurring as secondary products alongside the chlorine-substituted methyl isocyanide dichlorides which can be prepared according to the invention. A representative example of this is also given in the examples illustrating the process.

The reaction according to the invention is carried out at temperatures above 150° C. for example in the range from 150 to 250° C., advantageously between 190 and 210° C.

The degree of chlorination of the chloro-substituted methyl isocyanide dichlorides obtainable according to the invention is also determined by the reaction conditions. Higher reaction temperatures and longer reaction times as well as a large excess of chlorine increase the degree of chlorination.

The production of chloromethyl isocyanide dichloride (see reaction scheme) and trichloromethyl isocyanide dichloride is particularly important. The monochloro-substituted isocyanide dichloride is obtained if care is taken during the chlorination at 190 to 210° C. to distill off the initially formed monochloromethyl isocyanide dichloride from the reaction chamber as soon as it is formed. For this reaction, there is employed a reaction vessel with a column through which the monochloromethyl isocyanide dichloride is distilled off. It is quite easy to carry this out with very good yields since there is a considerable difference in boiling points between the chlorinated dimethyl carbamic acid chloride and the monochloromethyl isocyanide dichloride.

Trichloromethyl isocyanide dichloride is also obtained if the chlorination is carried out between 190 and 210° C., but the monochloromethyl isocyanide dichloride initially formed is not immediately removed from the reaction chamber, but is left therein for further chlorination. In practice, it is expedient to do this by using a reflux condenser. If the reaction is carried out for a sufficiently long period, a further substitution of all existing hydrogen atoms takes place and trichloromethyl isocyanide dichloride is obtained.

One particular embodiment of the process according to the invention consists in chlorinating the dimethyl carbamic acid halide in a manner known per se in a first stage and then subjecting the chlorination products formed directly i.e. without isolation, to the reaction according to the invention. Since it is generally the dimethyl carbamic acid chloride itself which is used in the production of chlorination products of dimethyl carbamic acid chloride, this method of procedure represents a simplification in the production of the end products according to the invention.

The process of the invention presents a number of advantages. Only simple reaction conditions are used and good yields are produced. The reaction does not require auxiliary agents.

Except for trichloromethyl isocyanide dichloride, the products according to the invention are novel and represent valuable intermediate products for the production of pest-control agents and synthetic plastics.

The products according to the invention are especially suitable for the production of insecticides. For example, they can be reacted with O,O-dialkyl thiolthionophosphoric acids or O,O-dialkyl thiolphosphoric acids, and with substitution of the chlorine atoms, products are obtained which correspond to the formulae given in Example 1. These phosphorus compounds containing thiol groups can be used directly as pest-control agents.

The production of two such compounds, using the products according to the invention, and also information relating to their activity, are to be seen from the supplement to Example 1.

The invention is further disclosed in the following examples, which are illustrative but not limitative thereof.

*Example 1*

1000 parts by weight of bis-chloromethyl carbamic acid chloride are heated to 185° C. in a reaction vessel with addition of chlorine. The reaction vessel is provided with a column. Phosgene is split off and the chloromethyl isocyanide dichloride distils off in a large quantity. The column is so controlled that the chloromethyl carbamic acid chloride can distil off quickly and continuously. The crude distillate which is obtained is then again subjected to a fractional distillation in vacuum. Chloromethyl isocyanide dichloride is obtained with a boiling point of 36 to 37° C./12 mm. Hg, $n_D^{20}$: 1.4984.

The bis-chloromethyl carbamic acid chloride used as starting material can be prepared by initially introducing a strong stream of chlorine at room temperature into, for example, 1000 parts by weight of dimethyl carbamic acid chloride, while irradiating with ultra-violet light. The temperature then rises to 120° C. The stream of chlorine is then reduced so that the temperature does not rise above 120 to 140° C. After the exothermic reaction has subsided, the reaction mixture is subjected to fractional distillation and the bis-chloromethyl carbamic acid chloride is obtained with a boiling point of 85–89° C./12 mm. Hg.

The use of the products according to the invention for the production of insecticides.

Production of:

[(C₂H₅O)₂P—S—]₂=C=N—CH₂—S—P(OC₂H₅)₂
‖                                               ‖
S                                               S

A solution of 14.7 g. of chloromethyl isocyanide dichloride in 50 ml. of acetone is introduced dropwise into a solution of 61 g. of the ammonium salt of O,O-diethyl thiolthionophosphoric acid in 200 ml. of acetone. The reaction mixture is then heated for about 30 minutes to boiling point, and is then cooled to room temperature and the precipitated ammonium chloride is suction-filtered. The filtrate is concentrated by evaporation in vacuo, the oily distillation residue is taken up in ether and washed neutral with water. After evaporating the solvent, there are obtained 60 g. of a viscous, orange-red oil, which corresponds to the formula indicated above.

Calculated for C₁₄H₃₂O₆NP₃S₆: C, 28.2%; H, 5.4%; N, 2.4%; P, 15.6%; S, 32.3%. Found: C, 28.7%; H, 5.5%; N, 2.9%; P, 15.4%; S, 31.8%.

If in the same manner, instead of the ammonium salt of O,O-diethyl thiolthionophosphoric acid, an equimolar quantity of ammonium salt of O,O-diethyl thiolphosphoric acid is introduced into the reaction, the compound of the following formula is obtained, in the form of a reddish brown oil.

[(C₂H₅O)₂P—S—]₂=C=N—CH₂—S—P(OC₂H₅)₂
‖                                               ‖
O                                               O 0.1% solutions considerably affect the development of plants having broad leaves, whereas grasses are generally not damaged.

0.1% solutions are 100% effective against cockroaches, bugs, weevils, flies, red spiders. The compounds are moreover active on the system and on the eggs effective. $DL_{50}$, about 5 mg./kg. of mouse.

In similar manner, the more highly substituted chlorine derivatives of the methyl isocyanide dichloride can also be converted into insecticides.

*Example 2*

A brisk stream of chlorine is first of all introduced at room temperature into 1075 parts by weight (10 mols) of dimethyl carbamic acid chloride, without addition of a solvent and whilst it is irradiated with ultra-violet light. The temperature rises to 120° C. The stream of chlorine is at first so controlled that the temperature does not rise above 120 to 140° C. After the exothermic reaction, which leads substantially to bis-chloromethyl carbacic acid chloride, has subsided, chlorination is continued with a column. With a chlorination temperature above 185° C., phosgene is split off and the chloromethyl isocyanide dichloride is distilled off in large quantity. The initial distillate is then again subjected to fractionation in vacuo using a column. Yield: 836 parts by weight.

The residue is unmodified bis-chloromethyl carbamic acid chloride, tetrachloromethyl carbamic acid chloride and trichloromethyl carbamic acid chloride. This residue can be used satisfactorily for the complete chlorination to the trichloromethyl isocyanide dichloride.

*Example 3*

1075 parts by weight are first chlorinated as in Example 2 to the bis-chloromethyl carbamic acid chloride stage. The temperature is then raised to 190 to 200° C. and further chlorination takes place under reflux until the internal temperature in the flask has fallen to 175° C. due to the strong reflux. A distilling off of the chloromethyl carbamic acid chloride is completely avoided by use of reflux. The reaction mixture which is obtained is subjected to fractional distillation.

The trichloromethyl isocyanide dichloride is obtained at 55 to 57° C./120 mm. Hg in a yield of 532 parts by weight, $n_D^{20}$: 1.5219. Practically all the remainder of the reaction mixture distils over at 110 to 112° C./17 mm. Hg and constitutes the bis-(dichloromethyl)-carbamic acid chloride, $n_D^{20}$: 1.5225.

This product can again be converted with chlorination into the trimethyl isocyanide dichloride at a temperature above 185° C. In this way, a total yield of 92% of the theoretical of trichloromethyl isocyanide dichloride is obtained.

What I claim is:

1. Process for the production of a chloro-substituted methylisocyanide dichloride having the formula $$(CR_6R_7Cl)—N=C\begin{matrix}Cl\\Cl\end{matrix}$$

in which $R_6$ and $R_7$ represent a member selected from the group consisting of hydrogen and chlorine which comprises treating a carbamic acid halide having the formula $$\begin{matrix}(CHR_1R_2)\\(CR_3R_4R_5)\end{matrix}N—\overset{O}{\underset{\|}{C}}—X$$

in which $R_1$, $R_2$, $R_3$, $R_4$ and $R_5$ represent a member selected from the group consisting of chlorine and hydrogen, and X represents a halide selected from the group consisting of bromine and chlorine with chlorine at temperatures within the range of from 150 to 250° C. and recovering said chloro-substituted methylisocyanide dichlorides thus formed.

2. Process according to claim 1 wherein said carbamic acid halide is $$(CH_3)_2NCOCl$$

and said chlorination is effected according to the following reaction scheme $$(CH_3)_2NCOCl + 4Cl_2 \longrightarrow Cl-CH_2-N=C\begin{smallmatrix}Cl\\Cl\end{smallmatrix} + COCl_2 + 4HCl$$

3. Process for the production of chloromethyl isocyanide dichloride which comprises treating bis-chloromethyl carbamic acid chloride with chlorine at a temperature between 185 to 210°, and continuously distilling off the chloromethyl isocyanide dichloride which is formed.

4. Process for the production of chloromethyl isocyanide dichloride which comprises first of all treating dimethyl carbamic acid chloride with chlorine whilst it is irradiated with ultra-violet light at temperatures between room temperature and 140° until the exothermic reaction subsides and then continuing the chlorination without irradiation at temperatures between 185 and 210° C. to thereby split off phosgene, and continuously distilling off chloromethyl isocyanide dichloride thus formed.

5. Process for the production of trichloromethyl isocyanide dichloride which comprises first of all treating dimethyl carbamic acid chloride with chlorine whilst it is irradiated with ultra-violet light at temperatures between room temperature and 140° C. until the exothermic reaction subsides and then continuing the chlorination without irradiation at temperatures between 190 and 210° C. under strong reflux to thereby split off phosgene, and recovering the trichloro methyl isocyanide dichloride from the reaction mixture by fractional distillation.

References Cited by the Examiner

Brintzinger et al.: Ber. Deut. Chem., vol. 82, pp. 389–399 (1949).

Petrov et al.: C.A., vol. 54, 10911–10912 (1960).

Prandtl et al.: Ber. Deut. Chem., vol. 62, pp. 1754–1768 (1929).

CHARLES B. PARKER, *Primary Examiner*.

UNITED STATES PATENT OFFICE
CERTIFICATE OF CORRECTION

Patent No. 3,190,918            June 22, 1965

Hans Holtschmidt

It is hereby certified that error appears in the above numbered patent requiring correction and that the said Letters Patent should read as corrected below.

Column 1, lines 57 to 60 and column 5, lines 6 to 9, the formulas, each occurrence, should appear as shown below instead of as in the patent:

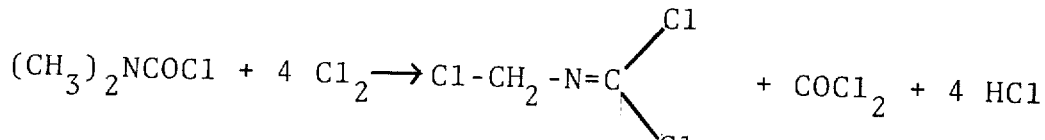

column 2, line 14, for "depedenent" read -- dependent --; column 4, line 20, for "carbacic" read -- carbamic --.

Signed and sealed this 23rd day of November 1965.

(SEAL)
Attest:

ERNEST W. SWIDER
Attesting Officer

EDWARD J. BRENNER
Commissioner of Patents